(12) United States Patent
Keller et al.

(10) Patent No.: US 6,845,549 B2
(45) Date of Patent: Jan. 25, 2005

(54) WORM DRIVE HOSE CLIP

(75) Inventors: Werner Keller, Maintal (DE); Stephan Mann, Bieber (DE); Hartmut Redemann, Hanau (DE); Willi Stichel, Maintal (DE)

(73) Assignee: Rasmussen GmbH, Maintal (DE)

( * ) Notice: Subject to any disclaimer, the term of this patent is extended or adjusted under 35 U.S.C. 154(b) by 85 days.

(21) Appl. No.: 10/405,838

(22) Filed: Apr. 2, 2003

(65) Prior Publication Data

US 2003/0188402 A1 Oct. 9, 2003

(30) Foreign Application Priority Data

Apr. 3, 2002 (DE) .......................................... 102 14 663
Jul. 16, 2002 (EP) .............................................. 02015824

(51) Int. Cl.⁷ ................................................ F16L 33/08
(52) U.S. Cl. .................................... 24/274 R; 24/20 R
(58) Field of Search ............................ 24/20 LS, 20 R, 24/274 P, 274 R, 279, 274 WS

(56) References Cited

U.S. PATENT DOCUMENTS

| | | | | |
|---|---|---|---|---|
| 3,950,830 A | * | 4/1976 | Duprez ...................... | 24/274 R |
| 4,237,588 A | * | 12/1980 | Rasmussen et al. ...... | 24/274 R |
| 4,257,149 A | * | 3/1981 | Sydendal .................. | 24/274 R |
| 4,473,928 A | * | 10/1984 | Johnson ...................... | 24/483 |
| 4,706,346 A | * | 11/1987 | Verges ....................... | 24/274 R |
| 5,560,087 A | * | 10/1996 | Marques ................... | 24/274 R |
| 6,449,813 B2 | * | 9/2002 | Keller et al. .............. | 24/274 R |

FOREIGN PATENT DOCUMENTS

| | | |
|---|---|---|
| DE | 2854676 | 6/1980 |
| DE | 94 19 543.9 U1 | 3/1995 |
| DE | 196 33 45 C1 | 2/1998 |
| DE | 196 33 435 C1 | 2/1998 |
| DE | 100 26 020 A1 | 11/2001 |

* cited by examiner

*Primary Examiner*—Robert J. Sandy
*Assistant Examiner*—Ruth C. Rodriguez
(74) *Attorney, Agent, or Firm*—Friedrich Kueffner

(57) ABSTRACT

A worm drive hose clip has a clamping strap with overlapping end sections, a clamping screw, and a housing. The radially outer end section has thread elements engaging the threaded screw shaft. The radially inner end section is connected to the housing bottom having a butt joint with interlocking undercuts. The bottom has a first transverse border with tongues arranged on opposite sides of the butt joint and projecting outwardly into an opening of the radially inner end section. A second straight transverse border of the bottom is supported on first grooves impressed radially inwardly in the clamping strap and opening toward the second transverse border. A second groove adjoins the opening and supports the bottom. The radially inner edges of the first and second circumferential grooves are aligned with an underside of the bottom and pass continuously into an inner side of the radially inner end section.

11 Claims, 5 Drawing Sheets

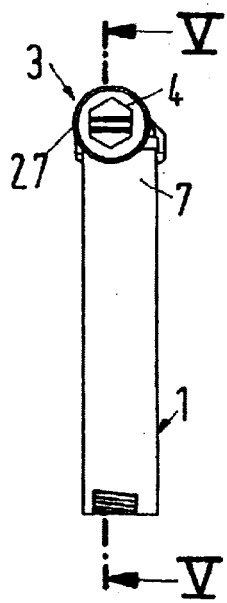
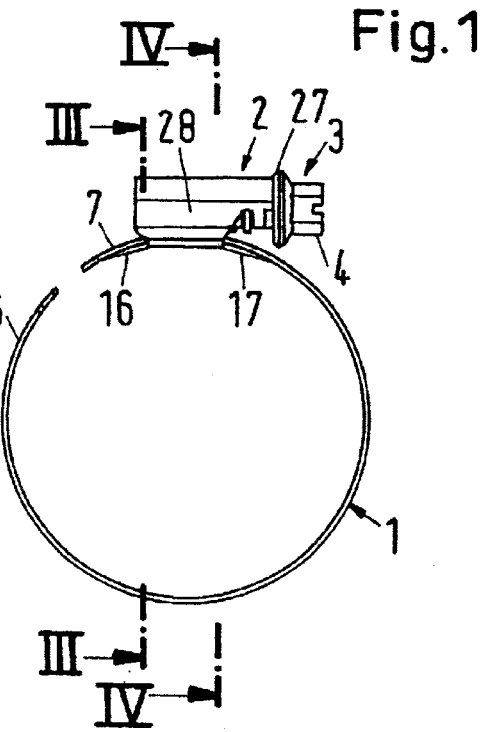
Fig. 2
Fig. 1
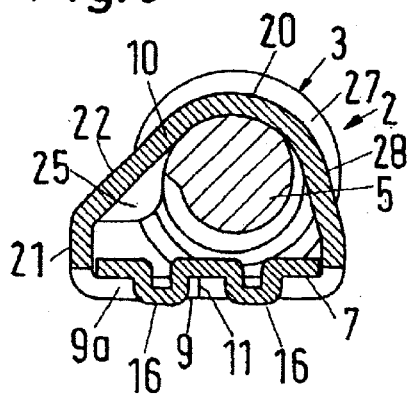
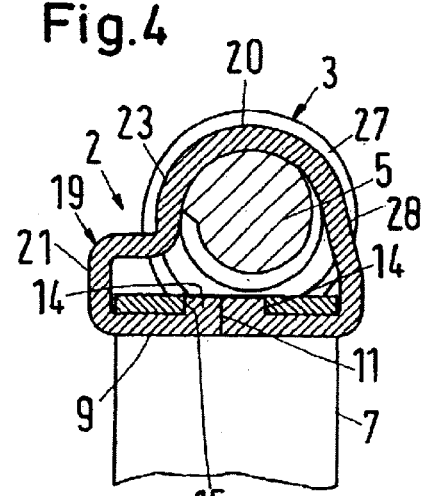
Fig. 3
Fig. 4
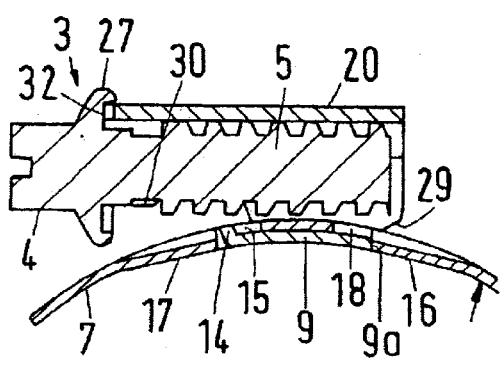
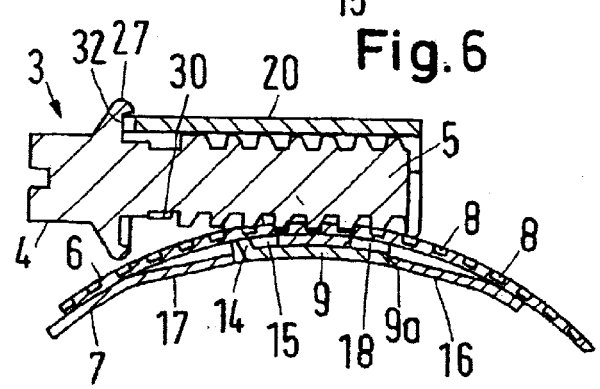
Fig. 5
Fig. 6

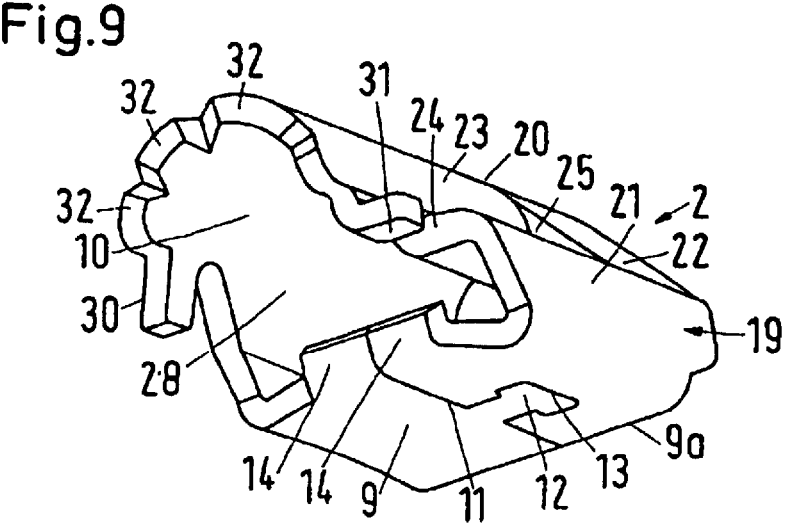
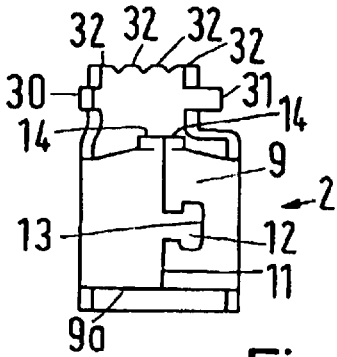
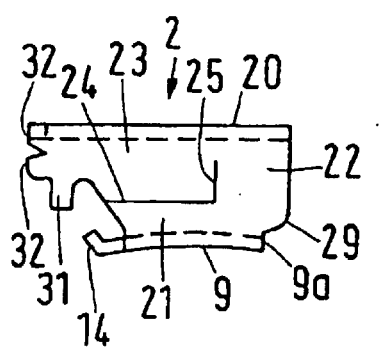
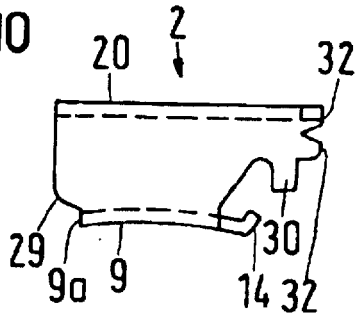
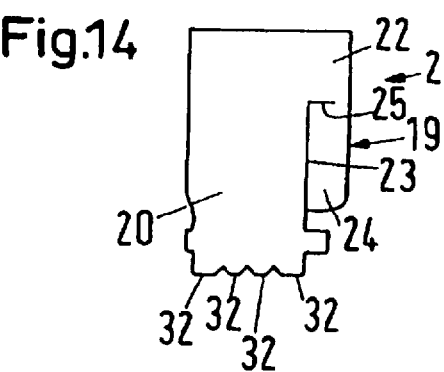

WORM DRIVE HOSE CLIP

BACKGROUND OF THE INVENTION

1. Field of the Invention

The invention relates to a worm drive hose clip comprising a clamping strap, a housing, and a clamping screw comprised of a head and a threaded shaft. The clamping strap has overlapping end sections. The radially outwardly positioned one of the end sections is provided with thread elements which engage the threaded shaft, and the radially inwardly positioned end section is positive-lockingly connected with a bottom of the housing surrounding the end sections and the threaded shaft of the clamping screw. The housing supports the clamping screw in both circumferential directions of the clip. The housing is comprised of a housing band whose ends delimit a butt joint in the area of the bottom of the housing and are connected with one another by interlocking undercuts provided at their edges delimiting the butt joint. The bottom of the housing is provided on a border facing the clamping screw head on both sides of the butt joint with one of two tongues, respectively, that are radially outwardly bent and project together into an opening in the radially inner end section of the clamping strap.

2. Description of the Related Art

In a known worm drive hose clip of this kind (DE 196 33 435 C1), only one opening is provided on each one of the transverse borders of the housing bottom in a folded or bent portion (groove) of the clamping strap, wherein the folded or bent portion is pressed outwardly and extends transversely to the clamping strap. On each transverse border, two tongues are provided which, while contacting one another, engage the same opening in a sidewall of the folded portion, respectively. The tongues are designed to prevent spreading apart of the butt joint from a central area, where the edges of the butt joint are positive-lockingly connected, toward the respective edges of the housing bottom. The tongues prevent moreover that the housing, before introduction of the clamping screw into the housing, can become detached from the clamping strap which would make difficult the insertion of the clamping screw. However, the introduction of the tongues provided on the transverse border of the housing bottom facing away from the clamping screw head into their common opening is also difficult. This transverse border is supported on the edge portions of the correlated opening positioned laterally adjacently to their tongues and is therefore supported only at two locations during clamping of the hose clip strap; for high clamping forces, this is not sufficient in many situations.

Moreover, there is the risk that the axial sidewalls of the folded or bent portion are pulled apart at very high clamping forces so that the folded portion will be deformed back into the plane of the clamping strap. It can happen that the tongues no longer engage the correlated openings provided at the transverse border of the housing bottom facing away from the clamping screw head. Moreover, the folded portion increases the radial spacing of the threaded screw shaft from the hose to be secured by means of the clip on a pipe so that the moment of flexion of the return deformation acting on the folded portion will increase. Despite this, the known hose clip withstands relatively high clamping forces. This can result in the person manipulating the clip attempting to increase the tension more and more in order to secure the hose as tightly as possible. This can result in the clamping strap becoming damaged, or even becoming detached, in the strap area provided with the embossed thread elements cooperating with the threaded screw shaft.

SUMMARY OF THE INVENTION

It is an object of the present invention to provide a worm drive hose clip of the aforementioned kind which is still loadable to a great extent and can be mounted easily, but substantially removes the risk of over-tightening during the clamping action while still providing a tight connection between a pipe or the like and a hose to be secured by means of the hose clip on the pipe.

In accordance with the present invention, this is achieved in that the transverse border of the bottom of the housing facing away from the head of the clamping screw has a continuous straight configuration and is supported on grooves that are open toward this transverse border and embossed or impressed radially inwardly in the clamping strap; in that a groove open toward the bottom adjoins in the clamping strap the opening that is common to the tongues and provided on the side of the clamping screw head, wherein the bottom is supported on this groove; in that the inner end section of the clamping strap is free of a radially outwardly oriented folded portion for receiving the bottom; and in that the grooves extend in the circumferential direction of the clip and the radially inner edge of each groove is aligned with the underside of the bottom and has a continuous transition into the inner side of the radially inner end section.

With this solution, the tongues on the transverse border of the housing bottom facing away from the clamping screw head are not needed so that not only their formation is eliminated but also the suspension of the housing in the radially inner end section of the clamping strap is simplified. Since this transverse border is loaded most upon tightening, it is supported in the case of two grooves supporting it at four locations by the opening edges of the grooves so that, in comparison to only one groove, the loadability of this transverse border is doubled as a result of the reduced surface pressure. The elimination of the groove-shaped folded or bent portion for receiving the housing bottom in the radially inner end section of the clamping strap has the advantage that a strap lengthening as a result of a return deformation of a folded portion upon tightening of the clamping strap is not possible and, in this way, the two tongues engaging the opening of the clamping strap at the screw head safely maintain their position in the opening and prevent a spreading apart of the housing bottom at clamping forces that are too high because they are supported at all times laterally on the edge of the common opening in the clamping strap.

Despite the elimination of the folded portion, the grooves ensure that between the housing bottom and the inner side of the radially inner end section of the clamping strap a continuous transition is provided which prevents a possible clamping force drop in the radial direction, as it would occur in the case of a stepped transition, so that the clip even in the area of the transverse borders of the housing bottom provides a uniform radial pressure on the hose so that the connection between the hose and the pipe remains tight in this area. The elimination of the folded portion has the additional advantage that the screw shaft has a corresponding minimal spacing from the hose and the risk of deformation of the clamping strap via a possibly present folded portion as a result of bending moments that are too great is eliminated.

Preferably, it is provided that the clamping strap in its radially outer side has a series of parallel grooves arranged slantedly relative to the longitudinal direction of the clamping strap and forming thread elements for the engagement of the thread of the clamping screw and that its radially inner side is planar or slightly undulated wherein a maximum height of the undulation is up to 60% of the maximum bottom thickness of the thread elements. In this configuration, the radial height of the housing is reduced relative to a configuration of the clamping strap where the thread elements provided in the radially outer end section of the clamping 'strap project from the radially inner side of this end section. Correspondingly, the play between the threaded shaft of the clamping screw and the radially inner end section of the clamping strap is reduced when the clip is open wherein the radially outer end section of the clamping strap is positioned outside of the housing. In this way, the clamping screw, which remains positive-lockingly secured in the housing, prevents, by contacting the radially inner end section of the clamping strap, a pivoting of the housing in the circumferential direction into a pivot angle position in which the tongues would become disengaged from their common opening and the housing would become detached from the clamping strap.

When the height of the undulation on the inner side of the radially outer end section of the clamping strap is almost zero, practically no friction occurs between this undulation and the clamped hose. On the other hand, a relatively minimal undulation in the area of the grooves forming the thread elements already prevents that the area of the grooves of the clamping strap becomes too thin during stamping, and this prevents rupturing or breaking of the clamping strap in this area. The undulation enables also maintaining a somewhat greater bottom thickness in the area of the grooves between the thread stays; this contributes to an increase of the service life of the stamping die which is used for configuring or producing the thread elements in the clamping strap.

An advantageous configuration resides in that the flanks of the thread elements of the clamping strap and of the thread stay of the clamping screw, which flanks are pressed against one another during clamping, are provided at their outer and inner ends with curved portions of certain radii and in that the steepness of their flanks for an extended (stretched out or lying flat) clamping strap is approximately 90° and in that the other flanks of the thread elements and of the thread stay at their ends have greater radii than the ends of the flanks pressed against one another and have a reduced steepness of the flanks in comparison to the flanks that are pressed against one another. This configuration of the thread elements of the clamping strap, on the one hand, and of the thread stay of the clamping screw, on the other hand, results in a higher loadability of the thread elements and of the thread stay. Accordingly, the thread elements and the thread stay engage one another by means of a longer and thus greater radial surface with a corresponding reduced surface pressure, and the corresponding complementary coining or stamping die has a longer service life.

This can be improved even more when the radii at the ends of the flanks pressed against one another during tightening of the clamping screw are substantially identical and when for the other flanks the radius at the free end of the flanks of the thread elements is smaller than the radius at the foot ends while at the free end of the flank of the thread stay the radius is greater than the radius at the foot end.

Moreover, it can be provided that the housing is embodied with a lateral bracket only on the right side (viewed in the direction from the head to the shaft of the clamping screw when the clamping screw is positioned above the clamping strap). The wall of the bracket is provided radially outside of the radially outer end section of the clamping strap, adjacent to the free end of the clamping screw shaft, with a wall portion that slantedly descends from a curved ridge of the top part of the housing tangentially to a radial wall portion of the bracket and, adjacent to a central section of the clamping screw shaft, with a curved wall portion, resting against the central section of the clamping screw shaft, and an axial wall portion connecting the curved wall portion with the radial wall portion. This bracket prevents lateral tilting of the housing in the rotational direction of the clamping screw. Its curved wall portion contributes to guiding of the clamping screw tangentially to the clip. The slantedly descending wall portion prevents widening of the curved wall portion and of the axial wall portion during tightening. At the same time, the slantedly descending wall portion reduces the contact surface between the thread of the threaded shaft of the clamping screw and the wall of the housing so that the thread in the area of the slantedly descending wall portion is subjected to reduced wear. The clamping screw therefore can be easily rotated even after multiple actuations and rotations. Accordingly, the torque required for tightening the clamping screw remains minimal over an extended period of use.

The curved wall portion and the axial wall portion can be formed by impressing the sidewall of the housing so that a wall portion extending transversely to the clamping screw remains between the slantedly descending wall portion, the curved wall portion, and the axial wall portion. This provides a high stiffness of the sidewall of the bracket against widening.

Preferably, the plane of the transversely extending wall portion crosses approximately the center of the section of the clamping screw providing thread engagement with the clamping strap. In the area of the center of the section of the clamping screw providing thread engagement with the clamping strap, the housing is subject to especially high forces which have the tendency to widen or spread apart the housing. In the aforementioned position, the transversely extending wall portion counteracts especially well such a widening tendency.

Moreover, the free edge of the top part of the housing facing the head of the clamping screw can be provided with teeth on which a radial surface of the head positioned transversely to the screw axis is positioned. Upon surpassing an upper limit of the clamping force, a deformation of the edges of the teeth and of the radial surface of the head results so that the clamping screw can be rotated only with greatly increasing friction, and, accordingly, the clip can be tightened further only to a limited extent. This prevents overloading of the clip which could otherwise cause breakage of the clamping strap.

Moreover, it can be provided that the bottom of the housing in the circumferential direction of the clip has a curvature whose radius of curvature corresponds substantially to that of the circumference of a hose clamped by means of the clip on a pipe; that the bottom in the circumferential direction is shorter than the top part of the housing and has such a position relative to the free end of the clamping strap that the greatest possible number of thread sections of the clamping screw is in engagement with the thread elements provided by stamping or embossing in the clamping strap. In this configuration, overloading of individual thread sections of the clamping screw and/or of the thread elements of the clamping strap is avoided.

Moreover, it is beneficial when the spacing of the opening for receiving the tongues from the edge of the clamping strap positioned to the right of the clamping screw, when viewed from the head to the shaft of the clamping screw, is smaller than the spacing of the opening from the opposite edge of the clamping strap. Viewed in the direction of the clamping screw head toward the clamping screw shaft, the left stay, positioned between the left longitudinal edge of the opening and the left edge of the clamping strap, is loaded during tightening of the clamping strap more strongly than the opposite stay and has, as a result of the eccentric position of the opening, a greater cross-section that is accordingly loadable to a greater extent than the oppositely positioned stay delimiting the opening.

Accordingly, the border of the housing bottom facing the head of the clamping screw can project at a slant relative to the tongues and in the direction toward the head. In this way, the shearing action of the edge of this border of the housing bottom on the clamping strap is reduced in comparison to a border extending perpendicularly to the circumferential direction of the curved clamping strap.

BRIEF DESCRIPTION OF THE DRAWING

In the drawing:

FIG. 1 is a side view of a worm drive hose clip according to the invention in the open state;

FIG. 2 shows another side view of the worm drive hose clip according to the invention in a position rotated by 90° relative to the position of FIG. 1;

FIG. 3 shows a section III—III of FIG. 1;

FIG. 4 shows a section IV—IV of FIG. 1;

FIG. 5 shows a section V—V of FIG. 2;

FIG. 6 shows the same sectional view as FIG. 5 but in the closed state of the clip;

FIG. 9 is a perspective view of the housing of the worm drive hose clip according to the invention;

FIG. 10 is a front view of the housing according to FIG. 9 at a smaller scale;

FIG. 11 is a bottom view of the housing according to FIG. 10;

FIG. 12 is a right side view of the housing according to FIG. 10;

FIG. 13 a left side view of the housing according to FIG. 10;

FIG. 14 is a plan view onto the housing according to FIG. 10;

DESCRIPTION OF THE PREFERRED EMBODIMENTS

Figure 8:
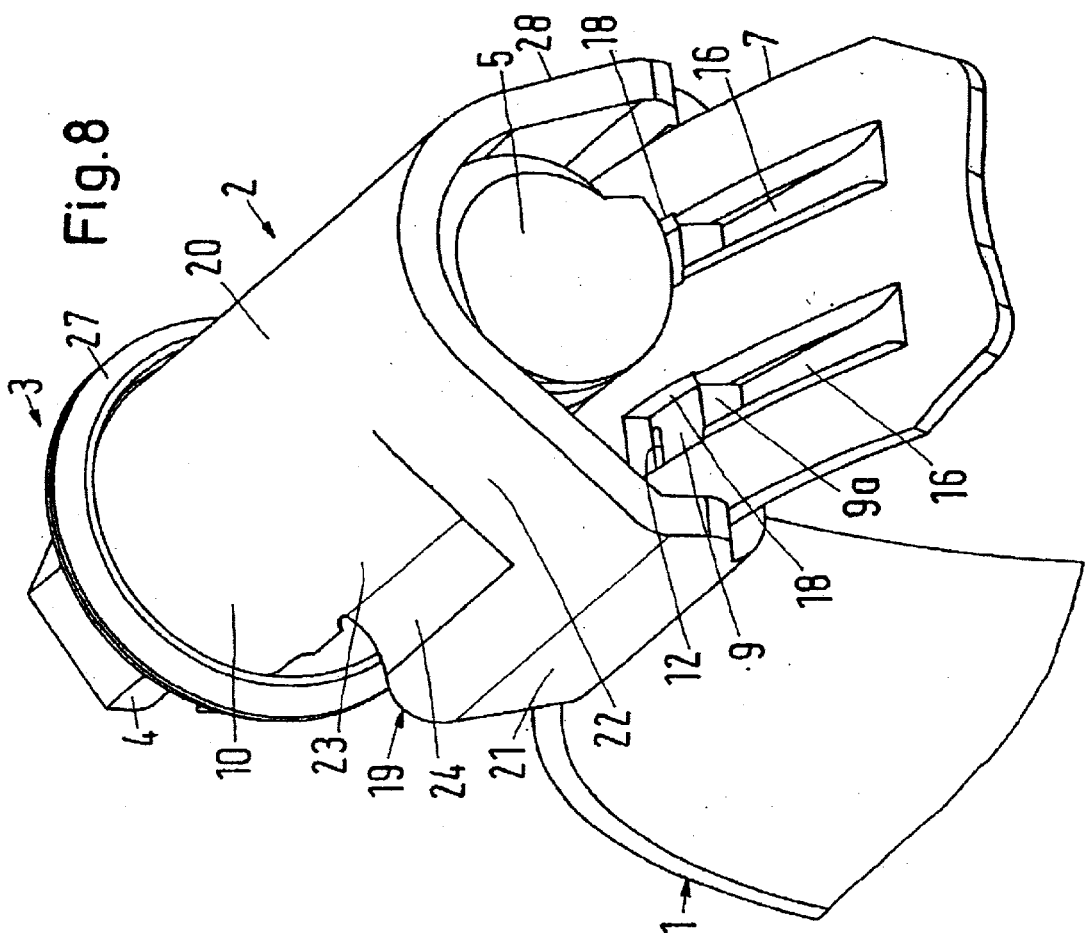
FIG. 8 shows an enlarged detail of the clip according to the invention as indicated by the circled portion of FIG. 7.
Figure 7:
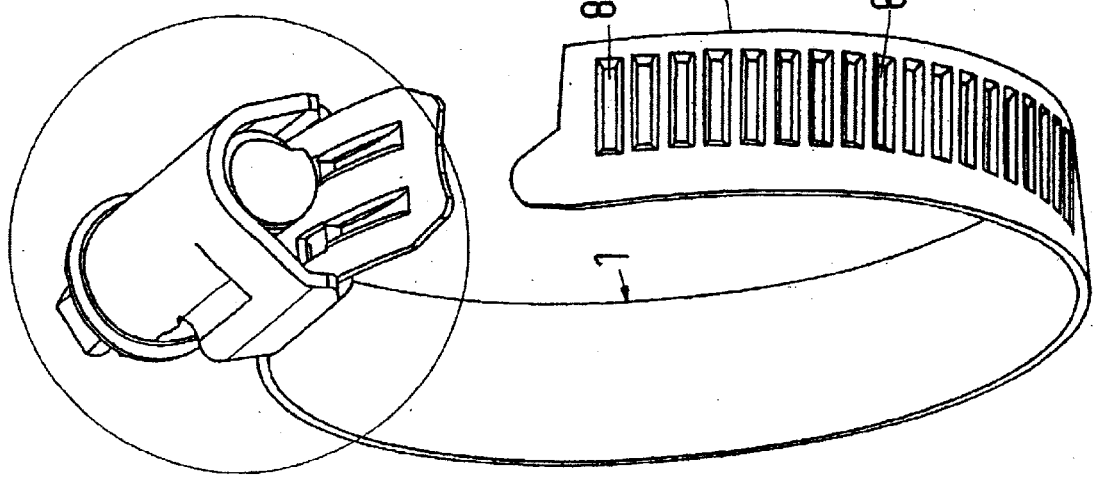
FIG. 7 is a perspective enlarged view of the clip according to the invention in the open state.
Figure 15:
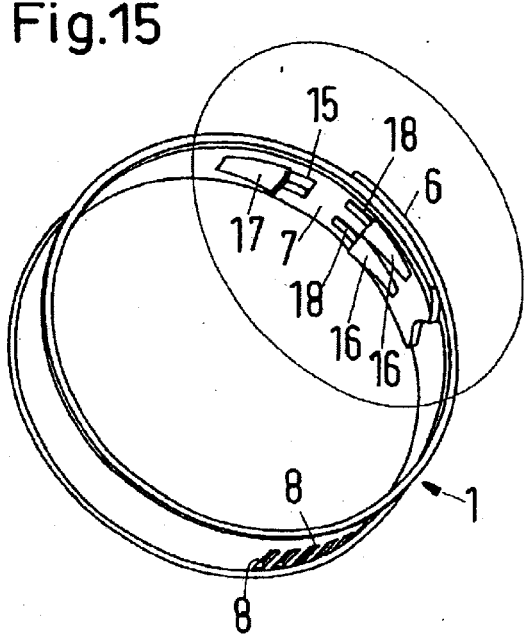
FIG. 15 is a perspective view of the clamping strap of the worm drive hose clip according to the invention.

The illustrated worm drive hose clip is comprised of a clamping strap 1, a housing 2, and a clamping screw 3 with a right-hand thread comprising a head 4 in a threaded shaft 5. The clamping strap 1 has overlapping end sections 6 and 7 in the circumferential direction of the closed worm drive hose clip (FIG. 6). The radially outer end section 6 is provided with thread elements 8 in the form of approximately axially extending grooves stamped or embossed into the clamping strap 1 which are engaged by the thread of the threaded shaft 5. The radially inner end section 7 is connected form-fittingly with a bottom 9 of the housing 2 surrounding both end sections 6, 7 and the threaded shaft 5. The housing 2 supports the clamping screw 3 in both circumferential directions of the clip and is comprised of a housing band 10 having ends that are connected in the area of the bottom 9 along a butt joint 11 (FIGS. 4, 9, 10, 11). The form-fitting (positive-locking) connection is formed by interlocking undercuts of the edges of the housing band 10 delimiting the butt joint 11. The interlocking undercuts are comprised of a hammerhead-shaped projection 12 at one end of the housing band 10 and a hammerhead-shaped cutout 13 matching the projection 12 at the other end of the housing band 10 (FIGS. 9 and 11). Instead of the hammerhead connection 12, 13, it is also possible to provide a dovetail connection.

The bottom 9 of the housing 2 has at one transverse border, facing the head 4 of the clamping screw 3, one of two radially outwardly bent tongues 14, respectively, on opposite sides of the butt joint 11. The tongues 14 project together through an opening 15 provided in the radially inner end section 7 of the clamping strap 1 (FIGS. 4 to 6). Moreover, this transverse border projects at a slant forwardly in the direction toward the clamping screw head 4 (FIG. 11). In this way, the edge of the transverse border facing the screw head 4 and contacting the curved inner side of the end section 7 when tightening the clip with increased linear pressure is elongated somewhat and, in comparison to a precisely axially extending transverse border, the shearing action exerted by it on the clamping strap 1 is accordingly reduced such that the clamping strap 1 withstands higher clamping forces without breaking. The other transverse border 9a of the bottom 9 of the housing 12 is continuously straight and is supported on grooves 16 which are open in the direction to the transverse border 9a and are impressed radially inwardly in the clamping strap 1. A groove 17 open toward the bottom 9 adjoins the opening 15 common to both tongues 14 at the side of the clamping screw head 4 and is formed in the radially inner end section of the clamping strap 1. The end of the bottom 9 positioned opposite the straight transverse border 9a is supported in the edge areas of the bottom 9 adjacent to the tongues 14. The inner end section 7 of the clamping strap 1 is free of a radially outwardly oriented bent portion which are provided in the worm drive hose clips of the prior art for receiving the bottom 9.

The grooves 16, 17 extend in the circumferential direction of the clip, and the radially inner edge of each groove 16, 17 is aligned with the bottom side of the bottom 9. In this connection, the edge has a continuous transition into the inner side of the radially inner end section 7. In this way, a substantially continuous transition between the housing bottom 9 and the inner side of the clamping strap 1 with corresponding uniform clamping pressure distribution about the circumferential area of the hose to be secured by means of the worm drive hose clip on a pipe, socket or the like adjacent to the bottom 9 of the housing 2.

Adjacent to the grooves 16, additional openings 18 formed in the radially inner end section 7 of the clamping strap 1 are provided. Like the opening 15, these openings 18 prevent that the clamping strap 1, when the grooves 16, 17 are formed therein, will break if only cuts extending transversely to the longitudinal extension of the strap were formed in the clamping strap 1 and the adjacent strap areas are pressed outwardly for forming the grooves 16, 17.

The housing 2 has a lateral bracket 19 only on the right side, viewed with the clamping screw 3 above the clamping strap 1 in the direction from the head 4 to the shaft 5 of the clamping screw 3. The wall of the bracket 19 is provided radially outside of the radially outer end section 6 of the clamping strap 1, adjacent to the free end of the clamping screw shaft 5, with a wall portion 22 that slantedly descends from a curved ridge 20 of the top part of the housing 2 tangentially to a radial wall portion 21 of the bracket 19. Moreover, the bracket 19 has, adjacent to a central section of the clamping screw shaft 5, a curved wall portion 23, resting against the central section of the clamping screw shaft 5, and an axial wall portion 24 connecting the curved wall portion 23 with the radial wall portion 21.

The curved wall portion 23 and the axial wall portion 24 are formed by impressing or embossing the side wall of the housing 2. In this connection, a wall portion 25 extending transversely to the clamping screw 3 remains between the slantedly descending wall portion 22, the curved wall portion 23, and the axial wall portion 24.

The plane of the transversely extending wall portion 25 crosses approximately the center of the section of the clamping screw 3 which provides thread engagement with the clamping strap 1.

Figure 16:
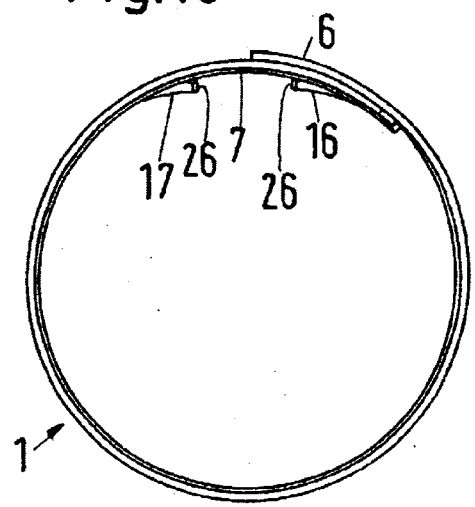
FIG. 16 is a side view of the clamping strap.
Figure 17:
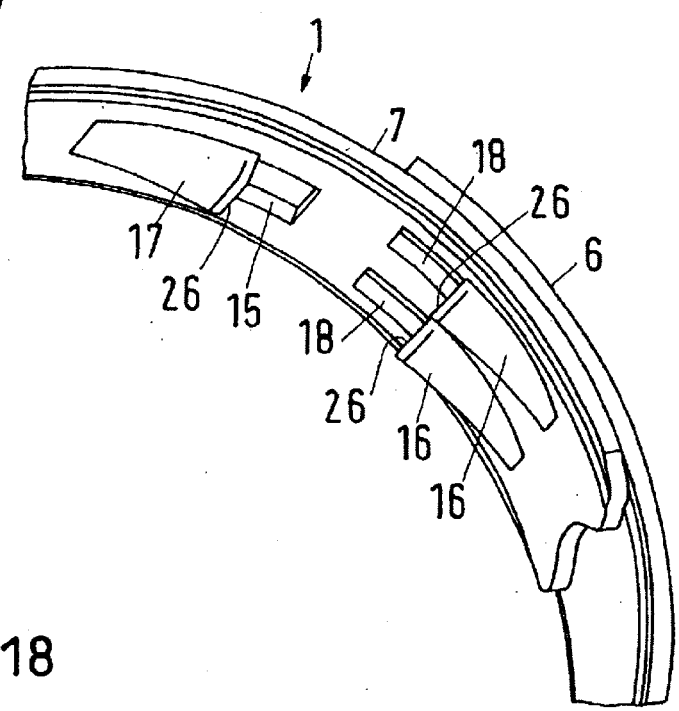
FIG. 17 shows the enlarged detail of the clamping strap as indicated by the circled portion of FIG. 15.
Figure 18:
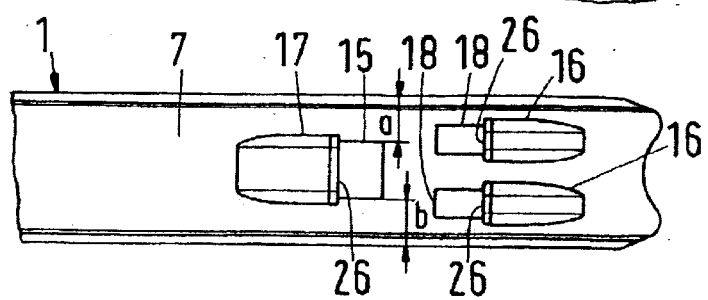
FIG. 18 is a bottom view of an end section of the clamping strap of the worm drive hose clip.

In this worm drive hose clip, the transverse border 9a and the oppositely positioned border areas of the housing bottom 9 are supported in the circumferential direction of the clamping strap 1 on the radial end faces of the opening edges 26 (FIGS. 16 to 18) of the grooves 16 and the groove 17 when tightening or releasing the worm drive hose clip. With respect to the transverse border 9a that is loaded the most, this provides a support action on four surfaces. The total support surface area on the transverse border 9a is thus greater than in the case of only two support surface areas, as is the case in the known devices (DE 196 33 435 C1) where the transverse border facing away from the screw head 4 of the housing bottom 9 is supported only on two surfaces located adjacent to one of the tongue pairs of an opening, for receiving the tongue pair, provided in a sidewall of the transverse groove provided in the housing bottom. Accordingly, the surface pressure on the most strongly loaded transverse border 9a of the housing bottom 9 is decreased and the connection to the housing bottom 9 and the clamping strap 1 can be loaded with a greater tightening force in the circumferential direction of the clamping strap 1 without causing material deformation. Moreover, the tongues 14, by engaging the opening 15, contribute to a fast connection of the two ends of'the housing band 10 in the area of the butt joint 11.

The right tongue 14 of FIG. 4 is loaded during tightening more strongly than the adjacently positioned tongue 14 and is thus wider in the transverse direction than the left tongue 14. Moreover, the spacing a of the opening 15 receiving the tongues 14, viewed in a direction from the head 4 to the shaft 5 of the clamping screw 3, from the edge of the clamping strap 1 positioned to the right of the clamping screw 3 is smaller than the spacing b of the opening 15 from the oppositely positioned edge of the clamping strap 1. The stay of the width b, positioned between one longitudinal edge of the opening 15 and one edge of the clamping strap, is therefore loaded more when tightening the clamping strap 1 because of the pitch of the thread element 8 and of the thread of the clamping screw 3 than the stay having the width a and has therefore, as a result of the eccentricity of the opening 15, a greater cross-section. Also, in the radially inner area of the opening edge 26 of the grooves 16 and 17, the transverse borders of the housing bottom 9 can be supported in the circumferential direction on the clamping strap 1.

The bracket 19 prevents a lateral tilting of the housing 2 upon right-hand rotation of the clamping screw 3 during tightening of the worm drive hose clip because the clamping screw 3 has the tendency to roll with its threaded shaft 5 on the topside of the radially outer end section 6 while it is also forced laterally by an axial force component in the direction to the bracket 19 because of the slanted thread elements 8. The force acting upon tightening of the clamping screw 3 onto the left housing wall shown in FIG. 4 has the tendency to bend the curved wall part 23 outwardly to the left in FIG. 4, i.e., to stretch it, but this is prevented by the axial wall portion 24 and the transversely extending wall portion 25 up to the point of very high tightening forces. Even though the clamping screw head 4 has a flange 27 projecting past the opening rim of the housing 2 (FIGS. 5 and 6) in order to prevent a rotation of the clamping screw 3 about an axial transverse axis during tightening, during which process the clamping screw head 4 has a tendency to move toward the clamping strap 1, such a rotation would not be precluded at very high tightening forces. For this reason, not only one sidewall 28 of the housing 2 is substantially planar, i.e., is not impressed inwardly toward the clamping screw 3 as the oppositely positioned sidewall between the wall portions 23 and 24, but also the slantedly descending wall portion 22 is straight, i.e., without depressions. This wall portion 22 therefore ensures additionally that the housing 2, on the one hand, will not widen or spread apart and, on the other hand, can not yield to the torque of the clamping screw 3 about its axial transverse axis.

Moreover, because of the slantedly descending wall portion 22, a spacing between an end section of the threaded shaft 5 of the clamping screw 3, having a length matching a width of the wall portion 22, and the housing wall is provided so that the thread does not contact the housing in the area of the slantedly descending wall portion 22 and is therefore subjected to less contact wear. The clamping screw 3 therefore remains easily actuatable over an extended period of time, even after several actuations and exertions of a high clamping force.

Since the transversely extending wall portion 25 of the bracket 19 is positioned substantially at the center of the section of the threaded shaft 5 of the clamping screw 3 engaging the end section 6 provided with the thread elements 8, this area of the housing 2 which is loaded the most in the transverse direction is very stiff or strong so that even at very high clamping forces it will not be widened or spread apart by the clamping screw 3.

The corners 29 (FIGS. 12, 13) on the housing end which is facing away from the clamping screw head 4 are rounded so that they penetrate less easily into the hose material and therefore do not damage it.

The end section of the housing 2 positioned at the clamping screw head 4 is provided at its radially inner edges with tabs 30 and 31 which, after introduction of the clamping screw 3 into the housing 2, are bent underneath the neck of the clamping screw 3 free of a thread portion (FIGS. 5 and 6) and prevent a return movement of the clamping screw 3 relative to the housing 2 upon opening (releasing) the worm drive hose clip by reverse rotation of the clamping screw 3.

The free edge of the top part of the housing 2 facing the head 4 of the clamping screw 3 is provided with teeth 32 on which a radial surface of the head 4, in this case the flange 27 of the head 4, rests. When the clamping force or the torque of the clamping screw 3 upon tightening surpasses a predetermined limit, the teeth 32 will deform so that their edges engage the radial surface of the clamping screw head 4. Subsequently, the tensile stress in the clamping strap 1 will increase by a significantly reduced value even when it is attempted to increase the clamping force or the torque even more so that the risk of breakage of the strap is substantially prevented. In contrast to this, up to the point of reaching this predetermined clamping force, before the teeth 32 are deformed, the clamping screw 3 can be rotated relatively easily and substantially without any hindrance.

Figure 19:
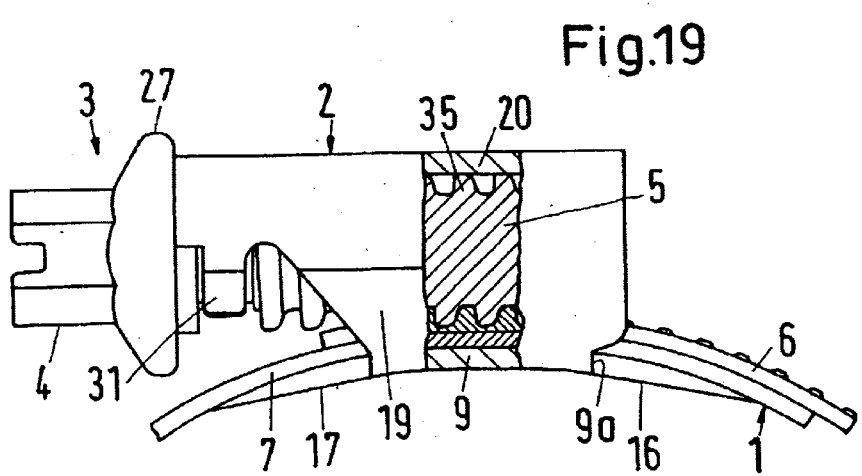
FIG. 19 is an axial section of the closure of the worm drive hose clip according to the intention in a broken-away area of the housing.
Figure 20:
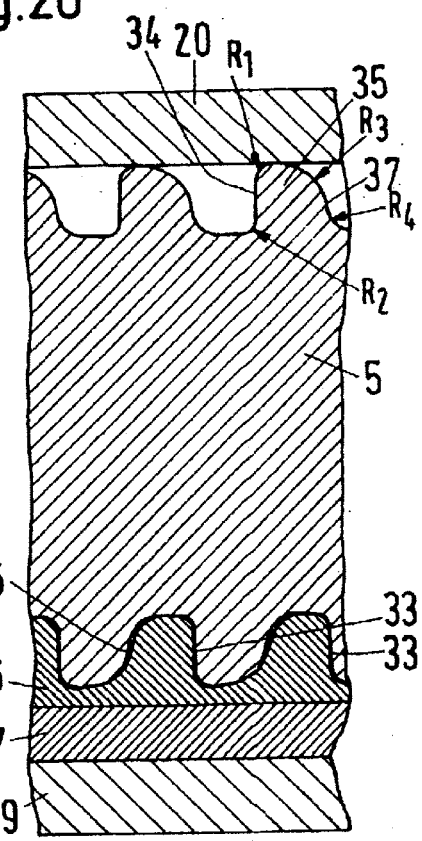
FIG. 20 is an enlarged axial section of FIG. 19.
Figure 21:
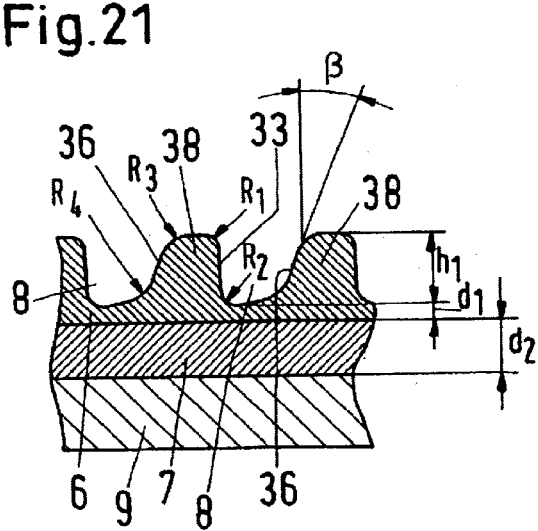
FIG. 21 is a separate illustration of a part of FIG. 20.

FIGS. 19 to 21 show the thread of the clamping screw 3 and the thread elements 8, which are illustrated only schematically in FIGS. 5 to 8, in more detail. Accordingly, the flanks 33, 34 of the thread elements 8 embossed in the clamping strap 1 and of the thread stay 35 of the clamping screw 3, which flanks are pressed against one another upon clamping of the clamping strap 1 by tightening the clamping screw 3, have rounded inner and outer ends with radii $R_1$ and $R_2$. The steepness of these flanks 33, 34 is approximately 90°. The other flanks 36 and 37 of the thread elements 8 and of the thread stay 35 have rounded ends with radii $R_3$ and $R_4$ which are greater than the radii $R_1$ and $R_2$. In contrast, the radius $R_3$ at the free end of the flanks 36 of the thread elements 8 is smaller than the radius $R_4$ at the foot end of the flank 36, while the radius $R_3$ at the free end of the flank 37 of the thread stay 35 is greater than the radius $R_4$ at the foot end of the flank 37. The radially inner side of the end section 6 of the clamping strap 1 provided with the thread elements 8 (FIG. 21) is substantially planar. The thread stay 38 between the thread elements 8 provided in the form of stamped grooves have a height $h_1$ in the range of 0.6 to 1 mm for a bottom thickness $d_1$ in the range of 0.2 to 0.5 mm and a clamping strap thickness $d_2$ in the range of 0.6 to 1 mm.

The steepness of the flanks 32 and 34 corresponds approximately to a flank angle of 90° while the steepness of the flanks 36 and 37 corresponds to an angle β of approximately 15°. This shape of the thread elements 8 or of the thread stays 38 in the radially outer end section 6 of the clamping strap 1 and the shape of the thread stay 35 of the clamping screw 3 have the following advantages. The steepness of the flanks 33 and 34 ensures that the thread stay 35 and the thread elements 8—in contrast to the slanted flanks which are pressed against one another—cannot become disengaged even at very high clamping forces by higher additional radial force components. The small radii $R_1$ and $R_2$ provide in the radial direction longer contacting flanks in comparison to greater radii and, accordingly, also reduced radial force components during clamping which have the tendency to force the thread of the clamping screw 3 and the thread elements 8 of the clamping strap 1 radially away from one another. The radii $R_3$ and $R_4$ that are greater in comparison to the radii $R_1$ and $R_2$ result in a greater width of the thread stays 38 at their free ends and at their foot end so that they can be loaded correspondingly to higher values before they would become deformed. The same holds true for thread stay 35 of the clamping screw 3 which is substantially complementary to the thread elements 8. The small radius $R_2$ and the greater radius $R_4$ have also the advantage that the corresponding teeth of the coining die having a complementary shape, which previously have been provided with a tip shaped approximately trapezoidally or with a roof shape for stamping the thread elements 8, have a longer service life because the substantially wedge-shaped teeth of the die can be more easily pressed into the material of the clamping strap 1. Beneficial values of the radii $R_1$ to $R_4$ for the aforementioned maximum values of the height $h_1$ are as follows:

$R_1$=0.25
$R_2$=0.3 mm
$R_3$=0.7 mm
$R_4$=0.5 mm

The substantially plane radially inner side of the end section 6 of the clamping strap 1 provided with a stamped thread in comparison to a stamped shape in which the radially inner side of the end section 6 is shaped substantially in an identical way to the radially outer side by employing a corresponding lower die during stamping, has the advantage that vibration-caused friction, in particular, when the worm drive hose clip is used in vehicles, between the stamped section of the clamping strip and the hose clamped by the worm drive hose clip on a pipe socket is substantially prevented.

Figure 22:
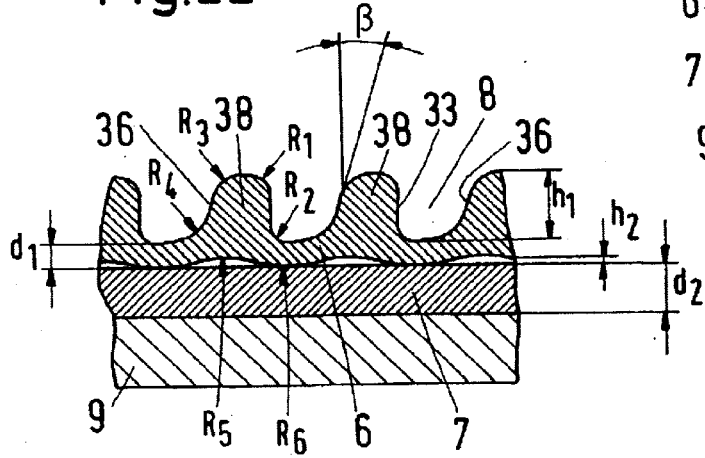
FIG. 22 shows the same detail as FIG. 21 but with the radially inner side of the outer end section of the clamping strap being slightly undulated.

The embodiment according to FIG. 22 illustrates a stamped end section 6 of the clamping strap 1 somewhat changed in comparison to that of FIGS. 19 to 21. In this embodiment, the radially inner side of the end section 6 is not plane but slightly undulated in a substantially symmetrical arrangement, wherein the minima of the undulated shape coincide, quasi synchronously, with those of the thread elements 8 and the maxima of the undulated shape with those of the thread stays 38. However, the radii $R_5$ of the maxima and the radii $R_6$ of the minima of the inner undulated shape are significantly greater than those of the outer undulations and the height $h_2$ of the inner undulated shape is much smaller than the height $h_1$ of the outer undulations. For example, for the radii $R_5$ and $R_6$ and the height $h_2$—all other values of the dimensions being identical to the previous embodiment of FIGS. 19 to 21—the following values are preferred:

$R_5$=2 mm
$R_6$=2 mm
$h_2$=0.1 to 0.3 mm

The values depend individually on the nominal diameter of the worm drive hose clip or the hose to be clamped, on the clamping strap width and the clamping strap material. The light undulation of the radially inner side of the end section 6 of the clamping strap 1, with regard to friction, can be essentially neglected; but this has the advantage that the bottom thickness $d_1$ is somewhat greater than in the preceding embodiment because for the same height $h_1$ of the thread stays 38 and for the same strap thickness $d_2$ as in the preceding embodiment the free ends of the thread stays 38 are positioned higher so that the tool or die for forming the thread elements 8 and the stays 38 must not penetrate so deeply into the strap material and accordingly must not compact the bottom between the thread stays 38 to such a great extent. This results in a significant increase of the service life of the stamping die or tool in comparison to the stamping tool used for the thread elements 8 and thread stays 38 in the preceding embodiment.

While specific embodiments of the invention have been shown and described in detail to illustrate the inventive principles, it will be understood that the invention may be embodied otherwise without departing from such principles.

What is claimed is:

1. A worm drive hose clip comprising:
   a clamping strap having overlapping end sections;
   a clamping screw comprised of a head and a threaded shaft;
   a housing enclosing the overlapping end sections and the threaded shaft of the clamping screw;
   wherein a radially outwardly positioned one of the overlapping end sections is provided with thread elements engaging the threaded shaft;
   wherein the radially inwardly positioned one of the overlapping end sections is positive-lockingly connected to a bottom of the housing, wherein the housing supports the clamping screw in a circumferential direction of the worm drive hose clip;
   wherein the housing is comprised of a housing band having ends, wherein the ends are connected to form a butt joint at the bottom of the housing and have edges delimiting the butt joint, wherein the edges have undercuts interlocked with one another to secure the butt joint;
   wherein the bottom of the housing has a first transverse border facing the head and the first transverse border has a tongue, respectively, on opposite sides of the butt joint, wherein the tongues are radially outwardly bent and project together into an opening provided in the radially inner end section of the clamping strap;
   wherein the bottom of the housing facing away from the head of the clamping screw has a second transverse border of a continuous straight configuration;
   wherein the clamping strap has first grooves pressed radially inwardly out of the clamping strap;
   wherein the second transverse border is supported on the first grooves and wherein the first grooves open toward the second transverse border;
   wherein the clamping strap has a second groove adjoining the opening common to the tongues and arranged proximal to the head, wherein the second groove is open toward the bottom and wherein the bottom is supported on the second groove;
   wherein the radially inner end section of the clamping strap is free of a radially outwardly oriented bent portion for receiving the bottom;
   wherein the first and second grooves extend in the circumferential direction of the worm drive hose clip and wherein a radially inner edge of each one of the first and second grooves is aligned with an underside of the bottom and has a continuous transition into an inner side of the radially inner end section.

2. The worm drive hose clip according to claim 1, wherein the clamping strap has a radially outer side provided with several parallel grooves extending at a slant to a longitudinal direction of the clamping strap, wherein the parallel grooves form the thread elements for engagement of the threaded shaft, and wherein the clamping strap has a radially inner side having a planar configuration or a slightly undulated shape, wherein a maximum height of the undulated shape is up to 60% of a maximum bottom thickness of the thread elements.

3. The worm drive hose clip according to claim 2, wherein first flanks of the thread elements and of a thread stay of the clamping screw, which first flanks are pressed against one another, have outer and inner ends with first radii and have a first steepness of approximately 90° when the clamping strap is stretched, and wherein second flanks of the thread elements and a third flank of the thread stay have ends with second and third radii greater than the first radii and have a second steepness smaller than the first steepness.

4. The worm drive hose clip according to claim 3, wherein:
   the first radii are substantially identical relative to one another;
   wherein a first one of the second radii on a free end of the second flanks of the thread elements is smaller than a second one of the second radii on foot ends of the second flanks of the thread elements); and
   wherein a first one of the third radii on a free end of the third flank of the thread stay is greater than a second one of the third radii on a foot end of the third flank of the thread stay.

5. The worm drive hose clip according to claim 1, wherein the housing has a lateral bracket only on a right side of the housing, viewed in a direction from the head to the threaded shaft of the clamping screw when the clamping screw is above the clamping strap, wherein the bracket has a wall provided radially outside of the radially outer end section of the clamping strap and adjacent to a free end of the threaded shaft, wherein the wall of the bracket has radial wall portion and a slantedly descending wall portion slantedly descending from a curved ridge of a top part of the housing tangentially to the radial wall portion, wherein the wall of the bracket has, adjacent to a central section of the threaded shaft, a curved wall portion, resting against the central section of the threaded shaft, and an axial wall portion connecting the curved wall portion with the radial wall portion.

6. The worm drive hose clip according to claim 5, wherein the curved wall portion and the axial wall portion are formed by impressing sidewalls of the housing such that a transversely extending wall portion is formed between the slantedly descending wall portion, the curved wall portion and the axial wall portion.

7. The worm drive hose clip according to claim 6, wherein a plane of the transversely extending wall portion crosses approximately a center of a section of the clamping screw being in thread engagement with the clamping strap.

8. The worm drive hose clip according to claim 6, wherein a free edge of a top part of the housing facing the head of the clamping screw is provided with teeth and wherein the head of the clamping screw has a radial surface positioned transversely to an axis of the clamping screw and resting against the teeth.

9. The worm drive hose clip according to claim 6, wherein the bottom of the housing in the circumferential direction of the worm drive hose clip has a curvature having a radius of curvature matching substantially a radius of a circumference of a hose to be clamped by the worm drive hose clip on a pipe, wherein the bottom in the circumferential direction is shorter than the top part of the housing and is positioned relative to a free end of the clamping screw such that a greatest possible number of thread sections of the threaded shaft of the clamping screw is in engagement with the thread elements.

10. The worm drive hose clip according to claim 1, wherein the opening for receiving the tongues, viewed in a direction from the head to the threaded shaft of the clamping screw, has a spacing from a first edge of the clamping strap positioned to the right of the clamping screw and wherein the spacing is smaller than a spacing of the opening from a second edge of the clamping strap opposite the first edge.

11. The worm drive hose clip according to claim 1, wherein the first transverse border of the bottom projects at a slant relative to the tongues and in a direction toward the head.

* * * * *